(12) United States Patent
De Jong et al.

(10) Patent No.: US 9,487,400 B2
(45) Date of Patent: Nov. 8, 2016

(54) PROCESS TO PREPARE A MIXTURE OF HYDROGEN AND CARBON MONOXIDE FROM A LIQUID HYDROCARBON FEEDSTOCK CONTAINING A CERTAIN AMOUNT OF ASH

(71) Applicant: Shell Oil Company, Houston, TX (US)

(72) Inventors: Johannes Cornelis De Jong, Amsterdam (NL); Franciscus Johanna Arnoldus Martens, Amsterdam (NL)

(73) Assignee: Shell Oil Company, Houston, TX (US)

( * ) Notice: Subject to any disclaimer, the term of this patent is extended or adjusted under 35 U.S.C. 154(b) by 134 days.

(21) Appl. No.: 14/136,133

(22) Filed: Dec. 20, 2013

(65) Prior Publication Data

US 2014/0103261 A1    Apr. 17, 2014

Related U.S. Application Data

(62) Division of application No. 11/947,631, filed on Nov. 29, 2007, now abandoned.

(60) Provisional application No. 60/868,685, filed on Dec. 5, 2006.

(30) Foreign Application Priority Data

Nov. 1, 2006 (EP) .................................. 06125229

(51) Int. Cl.
*C01B 3/36* (2006.01)
*C01B 3/24* (2006.01)
(Continued)

(52) U.S. Cl.
CPC .................. *C01B 3/24* (2013.01); *C01B 3/363* (2013.01); *C01B 3/48* (2013.01); *C01B 3/50* (2013.01);
(Continued)

(58) Field of Classification Search
CPC .......... C10J 3/485; C10J 3/845; C10J 3/506; C10J 3/526; C10J 3/466; C01B 2203/0485; C01B 2203/0465; C01B 2003/04; C01B 2203/0455; C01B 2203/048; C01B 2203/049
See application file for complete search history.

(56) References Cited

U.S. PATENT DOCUMENTS 3,537,977 A    11/1970   Smith
4,089,625 A    5/1978    Hofmann, Jr.
(Continued)

FOREIGN PATENT DOCUMENTS

BE    448868      1/1943
CA    2658157     1/2008
(Continued)

OTHER PUBLICATIONS

"Shell Gasification Process"; Oil and Gas Journal; pp. 85-90; Sep. 6, 1971.

*Primary Examiner* — Imran Akram

(57) ABSTRACT

A process to prepare a synthesis gas mixture comprising hydrogen and carbon monoxide from a liquid hydrocarbon feedstock containing between 0.1 and 4 wt % ash comprises performing a partial oxidation on a hydrocarbon feed using a multi-orifice burner provided with an arrangement of separate co-annular passages, wherein the hydrocarbon flows through a passage of the burner, an oxidizer gas flows through a separate passage of the burner and wherein the passage for hydrocarbon feed and the passage for oxidizer gas are separated by a passage through which a moderator gas flows and wherein the exit velocity of the moderator gas is greater than the exit velocity of the oxidizer gas.

1 Claim, 3 Drawing Sheets

(51) Int. Cl.
*C01B 3/48* (2006.01)
*C01B 3/50* (2006.01)
*C01B 3/52* (2006.01)
*C01B 3/56* (2006.01)

(52) U.S. Cl.
CPC . *C01B 3/52* (2013.01); *C01B 3/56* (2013.01); *C01B 2203/025* (2013.01); *C01B 2203/0283* (2013.01); *C01B 2203/04* (2013.01); *C01B 2203/043* (2013.01); *C01B 2203/048* (2013.01); *C01B 2203/0415* (2013.01); *C01B 2203/0465* (2013.01); *C01B 2203/0475* (2013.01); *C01B 2203/0485* (2013.01); *C01B 2203/06* (2013.01); *C01B 2203/061* (2013.01); *C01B 2203/062* (2013.01); *C01B 2203/065* (2013.01); *C01B 2203/0877* (2013.01); *C01B 2203/1247* (2013.01); *C01B 2203/146* (2013.01); *C01B 2203/148* (2013.01); *C01B 2203/84* (2013.01); *C01B 2203/86* (2013.01); *Y02P 30/30* (2015.11)

(56) References Cited

U.S. PATENT DOCUMENTS

| | | | |
|---|---|---|---|
| 4,165,274 A | 8/1979 | Kwant | |
| 4,218,423 A | 8/1980 | Robin et al. | |
| 4,272,255 A | 6/1981 | Coates | |
| 4,328,007 A | 5/1982 | Rafael | |
| 4,343,626 A | 8/1982 | Peise et al. | |
| 4,442,800 A | 4/1984 | Seifert et al. | |
| 4,444,726 A | 4/1984 | Crotty, Jr. et al. | |
| 4,466,808 A | 8/1984 | Koog | |
| 4,473,033 A | 9/1984 | Strohmeyer, Jr. | |
| 4,523,529 A | 6/1985 | Poll | |
| 4,525,175 A | 6/1985 | Stellaccio | |
| 4,525,176 A | 6/1985 | Koog et al. | |
| 4,666,463 A | 5/1987 | Stellaccio | |
| 4,705,542 A | 11/1987 | Gilmer | |
| 4,778,483 A | 10/1988 | Martin et al. | |
| 4,818,423 A | 4/1989 | Steinbach et al. | |
| 4,828,578 A | 5/1989 | Den Bleyker | |
| 4,852,997 A | 8/1989 | Segerstrom et al. | |
| 4,880,438 A | 11/1989 | Den Bleyker | |
| 5,069,755 A | 12/1991 | Durr et al. | |
| 5,133,941 A | 7/1992 | Hays et al. | |
| 5,293,843 A | 3/1994 | Provol et al. | |
| H001325 H | 7/1994 | Doering et al. | |
| 5,403,366 A * | 4/1995 | Leininger | C10J 3/06 252/373 |
| 5,513,599 A | 5/1996 | Nagato et al. | |
| 5,553,571 A | 9/1996 | Campbell et al. | |
| 5,570,645 A | 11/1996 | Garcia-Mallol | |
| 5,958,365 A | 9/1999 | Liu | |
| 5,968,212 A | 10/1999 | Peise et al. | |
| 6,033,456 A * | 3/2000 | Jahnke | C01B 3/36 75/505 |
| 6,702,936 B2 | 3/2004 | Rettger et al. | |
| 7,037,473 B1 | 5/2006 | Donner et al. | |
| 2001/0020346 A1 | 9/2001 | Schingnitz et al. | |
| 2006/0105278 A1 | 5/2006 | Katayama | |
| 2006/0228284 A1 * | 10/2006 | Schmidt | C01B 3/36 423/352 |
| 2007/0011945 A1 | 1/2007 | Grootveld et al. | |
| 2007/0062117 A1 | 3/2007 | Schingnitz et al. | |
| 2008/0134686 A1 * | 6/2008 | Menzel | C01B 3/48 60/783 |
| 2008/0222955 A1 | 9/2008 | Jancker et al. | |
| 2008/0256861 A1 * | 10/2008 | Van den Berg et al. | 48/210 |
| 2010/0140817 A1 | 6/2010 | Harteveld et al. | |
| 2010/0143216 A1 | 6/2010 | Ten Bosch et al. | |

FOREIGN PATENT DOCUMENTS

| | | |
|---|---|---|
| CN | 85104027 | 5/1985 |
| DE | 23420797 | 3/1975 |
| DE | 2935754 | 6/1980 |
| DE | 3009850 | 9/1981 |
| DE | 19643258 | 4/1998 |
| DE | 19829385 | 10/1999 |
| DE | 19952754 | 5/2001 |
| DE | 19957696 | 5/2001 |
| DE | 200317461 | 8/2004 |
| EP | 24281 | 3/1981 |
| EP | 127878 | 8/1988 |
| EP | 291111 | 11/1988 |
| EP | 160424 | 8/1989 |
| EP | 129737 | 4/1990 |
| EP | 168128 | 3/1991 |
| EP | 545281 | 6/1993 |
| EP | 683218 | 11/1995 |
| EP | 759886 | 3/1997 |
| EP | 1450028 | 8/2004 |
| GB | 1413996 | 11/1972 |
| WO | 9532148 | 11/1995 |
| WO | 9603345 | 2/1996 |
| WO | 9639354 | 12/1996 |
| WO | 9722547 | 6/1997 |
| WO | 9925648 | 5/1999 |
| WO | WO02079351 | 10/2002 |

* cited by examiner

PROCESS TO PREPARE A MIXTURE OF HYDROGEN AND CARBON MONOXIDE FROM A LIQUID HYDROCARBON FEEDSTOCK CONTAINING A CERTAIN AMOUNT OF ASH

This non-provisional application is a divisional of U.S. application Ser. No. 11/947,631, filed Nov. 29, 2009 which claims the benefit of U.S. Provisional Application No. 60/868,685 filed Dec. 5, 2006 and European Application No. 06125229.2 filed Dec. 1, 2006, both of which are incorporated by reference.

BACKGROUND

The following invention is directed to a process to prepare a mixture of hydrogen and carbon monoxide from a liquid hydrocarbon feedstock containing a certain amount of ash by partial oxidation of said feed.

Liquid hydrocarbons containing ash are for example liquids as obtained from tar sands, also referred to as oil sands or bituminous sands. Tar sands are a combination of clay, sand, water, and bitumen. Tar sands are mined to extract the oil-like bitumen which is upgraded into synthetic crude oil or refined directly into petroleum products by specialized refineries. Tar sands are mined using strip mining techniques, or persuaded to flow into producing wells by in situ techniques which reduce the bitumen's viscosity with steam and/or solvents. Typical upgrading techniques are hydrogen addition techniques such as for example described in U.S. Pat. No. 5,133,941 and in U.S. Pat. No. 5,069,755. These processes, according to the introductory passages of U.S. Pat. No. 6,852,215, generate undesirable waste materials which create significant disposal challenges for the upgrading facility and in addition lead to a reduction in the efficiency of the upgrading facility.

U.S. Pat. No. 4,165,274 describes a process wherein a tar sand oil is first separated in a vacuum distillation to obtain a vacuum residue and a vacuum distillate. The vacuum distillate is subjected to a hydrocracking step. The vacuum residue is subjected to a deasphalting step and the deasphalted oil is subjected to a hydrodesulphurization.

EP-A-683218 describes a process starting from a crude oil wherein a heavy fraction of said crude oil is subjected to a de-asphalting step and wherein the de-asphalted oil is blended with a lower boiling fraction of the crude oil before being subjected to a hydrocracking step. It is mentioned as an option to subject the asphaltene fraction obtained as by-product in the de-asphalting process to a partial oxidation to generate power and steam, hydrogen manufacture or hydrocarbon synthesis.

CN-A-1096808 describes a process for partial oxidation of an asphalt by-product of a de-asphalting process. The asphalt is a so-called Cn-asphalt, wherein n is 4 or higher. The asphalt feed is supplied to a gasification zone through at least a multi-orifice (co-annular) burner.

U.S. Pat. No. 6,702,936 describes a process to upgrade a tar sands feed to a sweet crude which is suited to be further refined in a normal refinery. The process scheme involves the gasification of an asphalt fraction as obtained in a de-asphalting step. The gasifier is not described in any detail.

A problem with the gasification of an asphalt fraction originating from a tar sands is that the feed will contain ash and that the feed will be very viscous. The highly viscous feed will require high feed temperatures in order to improve the ability to flow of the feed. In addition the feed may contain next to the ash also solid hydrocarbon agglomerates and lower boiling fractions. The high feed temperatures and/or the presence of lower boiling fractions or solids in the feed could give cause to a short burner life-time because of burner tip damage.

An aim of the present invention is to provide a process, which solves the above referred to problems.

SUMMARY OF THE INVENTION

Figure 1:
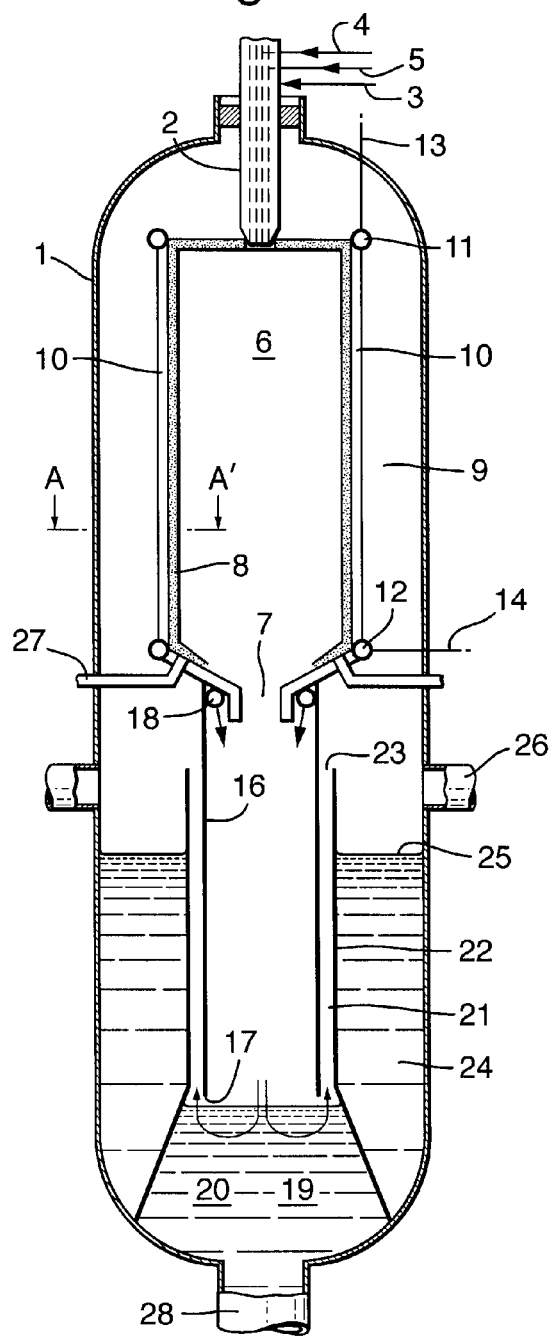
FIG. 1 is a cross-sectional view of a reactor according to an embodiment of the invention.

The following process provides a process which enables one to gasify the above described feed. In a preferred embodiment, the invention provides a process to prepare a synthesis gas mixture comprising hydrogen and carbon monoxide from a liquid hydrocarbon feedstock containing between 0.1 and 4 wt % ash by performing a partial oxidation on said hydrocarbon feed using a multi-orifice burner provided with an arrangement of separate passages, wherein the hydrocarbon flows through a passage of the burner, an oxidizer gas flows through a separate passage of the burner and wherein the passage for hydrocarbon feed and the passage for oxidizer gas are separated by a passage through which a moderator gas flows and wherein the exit velocity of the moderator gas is greater than the exit velocity of the oxidizer gas.

Applicants found that it is possible to convert a liquid and ash containing feed to a mixture of carbon monoxide and hydrogen by means of partial oxidation. Such a process may find advantageous use in a process to upgrade the liquid asphalt fraction as obtained in an upgrading process of a tar sand feed. The mixture of carbon monoxide and hydrogen may advantageously be used to generate hydrogen, for use in the hydrogen addition upgrading process of a tar sands feed and/or to generate power.

Applicants found that by operating the multi-orifice burner in the manner as claimed an improved burner lifetime is achieved. For similar viscosity type feeds a substantially improved lifetime is observed when compared to burners operating under the conditions of the state of the art process. Furthermore less temperature fluctuations are observed in the reactor when performing the process of the invention. This is an indication that less flame mode changes are present. Frequent changes in flame modes are indicative for an operation wherein burner damage may occur.

Without wishing to be bound to the following theory applicants believe that the more stable and less damaging operation of the burner results by using a moderator gas having a high velocity as a separate medium between oxidizer gas and hydrocarbon feed. The moderator gas will break up the hydrocarbon feed and act as a moderator such that reactions in the recirculation zone at the burner tips are avoided. The result will be that the hydrocarbon droplets will only come in contact with the oxidizer gas at some distance from the burner surface. It is believed that this will result in less burner damage, e.g. burner tip retraction. The invention and its preferred embodiments will be further described below.

As explained above the relative velocity of the hydrocarbon feed and the moderator gas is relevant for performing the present invention. Preferably the exit velocity of the moderator gas is at least 5 times the velocity of the hydrocarbon feed in order to achieve a sufficient break up of the liquid feed. Preferably the exit velocity of the hydrocarbon feed is between 2 and 40 m/s and more preferably between 2 and 20 m/s. The exit velocity of the moderator gas is preferably between 40 and 200 m/s, more preferably between 40 and 150 m/s. The exit velocity of the oxidizer gas is preferably between 30 and 120 m/s, more preferably between 30 and 70 m/s. The respective velocities are measured or calculated at the outlet of the said respective channels into the gasification zone.

Oxidizer gas comprises air or (pure) oxygen or a mixture thereof. With pure oxygen is meant oxygen having a purity of between 95 and 100 vol %. The oxidizer gas preferably comprises of a mixture of said pure oxygen and moderator gas. The content of oxygen in such a moderator/oxygen mixture the oxidizer gas is preferably between 10 and 30 wt % at standard conditions. As moderator gas preferably steam, water or carbon dioxide or a combination thereof is used. More preferably steam is used as moderator gas.

The hydrocarbon feed is liquid when fed to the burner and preferably has a kinematic viscosity at 232° C. of between 300 and 6000 cSt more preferably between 3500 and 5000 cSt, having a bulk density of between 650 and 1200 Kg/m$^3$. The ash content is between 0.1 and 4 wt %, especially between 1 and 4 wt %. The ash may comprise silicium, aluminium, iron, nickel, vanadium, titanium, potassium, magnesium and calcium. The feed may comprise halogen compounds, such as chloride. The sulphur content is between 1 and 10 wt %.

The feed is preferably obtained in a tar sands upgrading process, more preferably such an upgrading facility involves a hydrogen addition type process, such as for example described in the earlier referred to prior art publications. The feed may also be derived from a tar sands upgrading facility involving carbon rejection processes. Examples of such processes are the fluid catalytic cracking (FCC) process, thermal cracking and vis-breaking processes More preferably the feed is the asphalt fraction of a solvent de-asphalting process performed on a vacuum residue of a tar sands oil or performed on a vacuum residue of the effluent of a hydrogen addition process or a carbon rejection process as performed on a tar sands distillate or residue fraction. In a preferred embodiment the feed may be both the vacuum residue and the asphalt, which may be isolated from said residue by de-asphalting. This is advantageous because in case the de-asphalting process fails for one reason or the other the gasification may continue using the vacuum residue as feed. An example of a typical feed to be used in the process of the present invention is provided in Table 1.

TABLE 1

| Specific Density | Kg/m$^3$ | 1181 |
|---|---|---|
| Bulk Density | Kg/m$^3$ | 670 |
| Chloride | Ppmw | 10 |
| Carbon | % w | 85.7 |
| Hydrogen | % w | 6.7 |
| Sulphur | % w | 4.4 |
| Nitrogen | % w | 1.6 |
| Ash | % w | 1.3 |
| Oxygen | % w | 0.2 |
| Ash | % w | 1.3 |
| Viscosity | | |
| @ 330° F. | cP | 26700 |
| @ 410° F. | cP | 1340 |
| @ 232° C. | cSt | 4660 |

The multi-orifice burner is provided with an arrangement of separate, preferably co-annular passages. Such burner arrangements are known and for example described in EP-A-545281 or DE-OS-2935754. Usually such burners comprise a number of slits at the burner outlet and hollow wall members with internal cooling fluid (e.g. water) passages. The passages may or may not be converging at the burner outlet. Instead of comprising internal cooling fluid passages, the burner may be provided with a suitable ceramic or refractory lining applied onto or suspended by a means closely adjacent to the outer surface of the burner (front) wall for resisting the heat load during operation or heat-up/shut down situations of the burner. Advantageously, the exit(s) of one or more passages may be retracted or protruded.

The burner preferably has 4, 5, 6 or 7 passages. In a preferred embodiment the burner has 6 or 7 passages. In an even more preferred embodiment the burner has 7 passages wherein a shielding gas flows through the outer most passage at a velocity of between 5 and 40 m/s. The shielding gas is preferably the same gas as used for the moderator gas. In the embodiment wherein the number of passages are 7, preferably the following streams flow through the below listed passages:

an oxidizer flows through the inner most passage 1 and passage 2, a moderator gas flows through passage 3, a hydrocarbon feed flows through passage 4, a moderator gas flows through passage 5, an oxidizer flows through passage 6, and a shielding gas flows through outer most passage 7, preferably at a velocity of between 5 and 40 m/s.

Alternatively the number of passages is 6 wherein passages 1 and 2 of the above burner are combined or wherein the passage 7 is omitted.

The process according to the present invention is preferably performed at a syngas product outlet temperature of between 1000 and 1800° C. and more preferably at a temperature between 1300 and 1800° C. The pressure of the mixture of carbon monoxide and hydrogen as prepared is preferably between 0.3 and 12 MPa and preferably between 3 and 8 MPa. The ash components as present in the feed will form a so-called liquid slag at these temperatures. The slag will preferably form a layer on the inner side of the reactor wall, thereby creating a isolation layer. The temperature conditions are so chosen that the slag will create a layer and flow to a lower positioned slag outlet device in the reactor. The slag outlet device is preferably a water bath at the bottom of the gasification reactor to which the slag will flow due to the forces of gravity.

The temperature of the syngas is preferably reduced by directly contacting the hot gas with liquid water in a so-called quenching step. Preferably the slag water bath and the water quench are combined.

The direct contacting with liquid water is preferably preceded by injecting water into the flow of syngas steam. This water may be fresh water. In a preferred embodiment a solids containing water may partly or wholly replace the fresh water. Preferably the solids containing water is obtained in the water quenching zone as will be described below and/or from the scrubber unit as will be described below. For example the bleed stream of the scrubber unit is used. Use of a solids containing water as here described has the advantage that water treatment steps may be avoided or at least be limited.

In a preferred embodiment of the present invention the liquid water of the quenching step and the water bath for receiving the slag for is combined. Such combined slag removing means and water quench process steps are known from for example in U.S. Pat. No. 4,880,438, U.S. Pat. No. 4,778,483, U.S. Pat. No. 4,466,808, EP-A-129737, EP-A-127878, U.S. Pat. No. 4,218,423, U.S. Pat. No. 4,444,726, U.S. Pat. No. 4,828,578, EP-A-160424, U.S. Pat. No. 4,705,542, EP-A-168128.

The temperature of the synthesis gas after the water quench step is preferably between 130 and 330° C.

Figure 2:
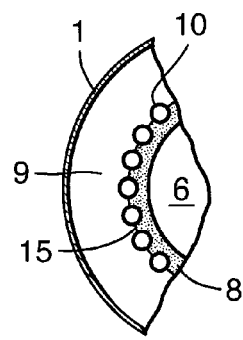
FIG. 2 is a cross-sectional view of a portion of the reactor taken along line A-A' of FIG. 1.

The process is preferably performed in a reactor vessel as illustrated in FIG. 1. The Figure shows a gasification reactor vessel (1), provided at its upper end with a downwardly directed multi-orifice burner (2). Burner (2) is provided with supply conduits for the oxidizer gas (3), the hydrocarbon feed (4) and the moderator gas (5). The burner (2) is preferably arranged at the top end of the reactor vessel (1) pointing with its outlet in a downwardly direction. The vessel (1) preferably comprises a combustion chamber (6) in the upper half of the vessel provided with a product gas outlet (7) at its bottom end and an opening for the outlet of the burner (2) at its top end. Between the combustion chamber (6) and the wall of vessel (1) an annular space (9) is provided. The wall of the combustion chamber protects the outer wall of vessel (1) against the high temperatures of the combustion chamber (6). The combustion chamber (6) is preferably provided with a refractory lined wall (8) in order to reduce the heat transfer to the combustion chamber wall. The refractory wall (8) is preferably provided with means to cool said refractory wall. Preferably such cooling means are conduits (10) through which water flows. Such conduits may be arranged as a spirally wound design in said tubular formed refractory wall (8). Preferably the cooling conduits (10) are arranged as a configuration of parallel-arranged vertical conduits, which may optionally have a common header at their top (11) and a common distributor at their bottom (12) for discharging and supplying water respectively from the cooling means. The common header (11) is fluidly connected to a steam discharge conduit (13) and the common header (12) is fluidly connected to a water supply conduit (14). More preferably the cooling conduits (10) are interconnected such that they form a gas-tight combustion chamber (6) within the refractory wall as shown in FIG. 2. Such interconnected conduits type walls are also referred to as a membrane wall.

The cooling by said conduits (10) may be achieved by just the cooling capacity of the liquid water, wherein heated liquid water is obtained at the water discharge point. Preferably cooling is achieved by also evaporation of the water in the conduits (10). In such an embodiment the cooling conduits are vertically arranged as shown in FIG. 1 such that the steam as formed can easily flow to the common header (11) and to a steam outlet conduit (13) of the reactor vessel (1). Evaporation is preferred as a cooling method because the steam may find use in other applications in the process, such as process steam for shift reactions, heating medium for liquid feed or, after external superheating, as moderator gas in the burner according to the process according to the present invention. A more energy efficient process is so obtained.

The gasification vessel (1) preferably comprises a vertically aligned and tubular formed outlet part (16) fluidly connected to the lower end of the combustion chamber (6), which tubular formed outlet part (16) is open at its lower end, further referred to as the gas outlet (17) of the tubular outlet part (16). The outlet part (16) is provided at its upper end with means (18) to add a quenching medium to the, in use, downwardly flowing mixture of hydrogen and carbon monoxide. Preferably the vessel (1) is further provided at its lower end with a combined water quenching zone (19) and slag discharge water bath (20) as described above. The water quenching zone (19) is present in the pathway of the synthesis gas as it is deflected at outlet (17) in an upwardly direction (see arrows) to flow upward through, an annular space (21) formed between an optional tubular shield (22) and outlet part (16). In annular space (21) the synthesis gas will intimately contact the water in a quenching operation mode. The upper end (23) of the annular space is in open communication with the space (24) between outlet part (16) and the wall of vessel (1). In space (24) a water level (25) will be present. Above said water level (25) one or more synthesis product outlet(s) (26) are located in the wall of vessel (1) to discharge the quenched synthesis gas. Between space (24) and annular space (9) a separation wall (27) may optionally be present.

At the lower end of vessel (1) a slag discharge opening (28) is suitably present. Through this discharge opening (28) slag together with part of the water is charged from the vessel by well known slag discharge means, such as sluice systems as for example described in U.S. Pat. No. 4,852,997 and U.S. Pat. No. 67,559,802.

The process according to the present invention will preferably be performed near or at a tar sands upgrading facility because the produced synthesis gas can directly be applied as a feedstock for the production of hydrogen or as a fuel gas, for example, for heating the furnaces of the upgrading process or more efficiently for the firing of gas turbines to produce electricity and heat. Hydrogen as prepared by the above process may be advantageously used in a hydrogen addition process as part of a tar sands upgrading process as described in, for example, the earlier referred to U.S. Pat. No. 4,165,274, U.S. Pat. No. 5,133,941 and U.S. Pat. No. 5,069,755.

In addition to the above uses the synthesis gas as prepared may also be advantageously used as a feedstock for making methanol, dimethyl ether, ammonia or hydrocarbons via the Fischer-Tropsch process. In turn methanol and dimethyl ether may be used to prepare lower olefins like ethene and propene. The Fischer-Tropsch synthesis yields gaseous hydrocarbons and liquid hydrocarbons such as naphtha, middle distillates, lube oils and waxes. In a preferred embodiment the synthesis gas as prepared from the liquid ash containing hydrocarbon feed is used to prepare a Fischer-Tropsch naphtha and a gas oil product wherein the naphtha product is used as solvent for the raw tar sands or bitumen in order to decrease their viscosity and make the suited for transport between the bitumen production well area and the bitumen upgrading facility. The Fischer-Tropsch derived gas oil is preferably used to upgrade the gas oil as obtained from the tar sands or bitumen in said upgrading process.

Figure 3:
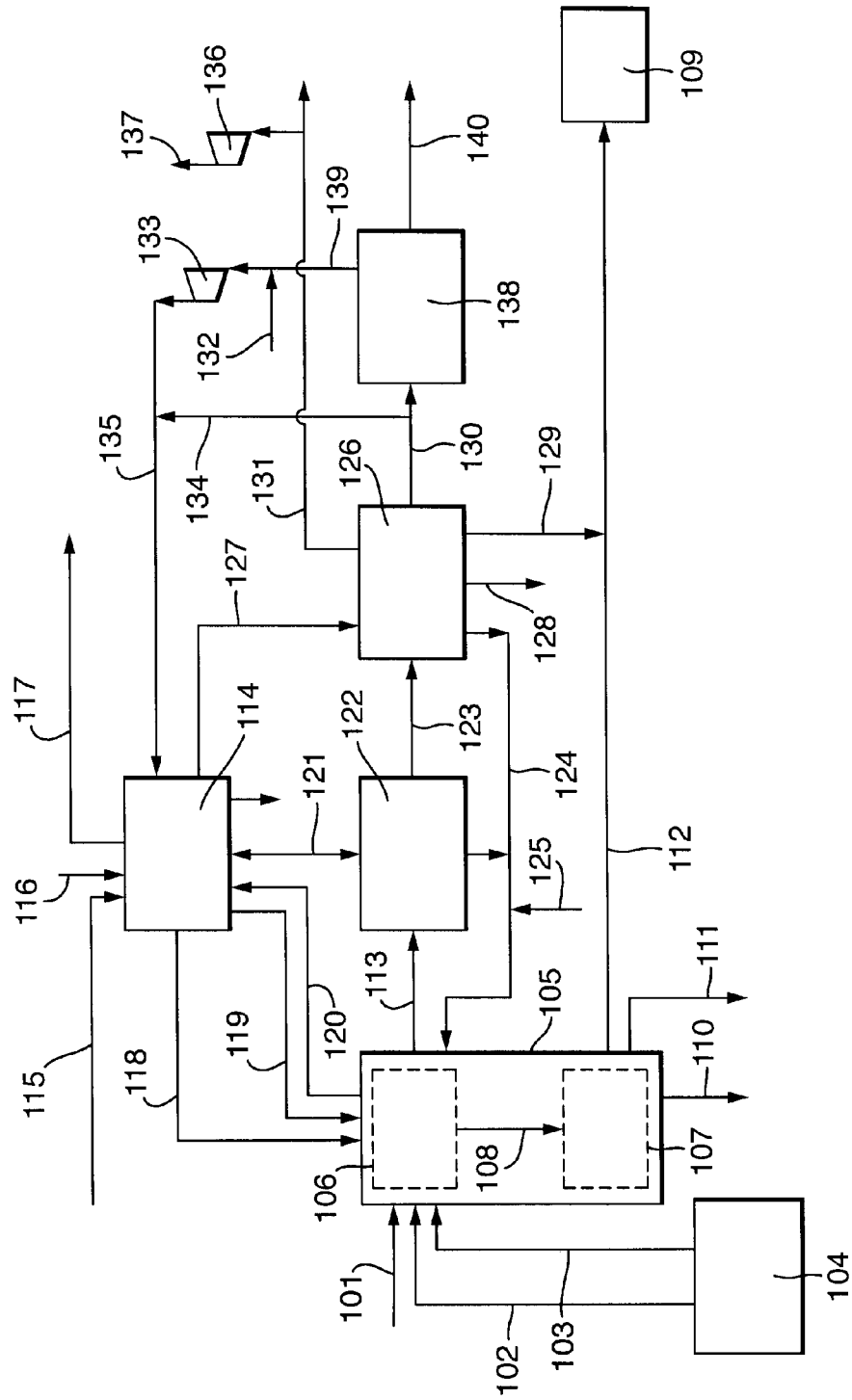
FIG. 3 is a flow diagram of a process according to an embodiment of the invention.

FIG. 3 illustrates how the process according to the present invention and the reactor of FIG. 1 can be applied in the production of pure hydrogen. In this scheme to a gasification reactor 105 an asphalt feed 101, oxygen 102 and super heated steam 119 from a gas turbine/steam turbine utilities block 114 are fed to a burner according to the process of the present invention as present in combustion chamber 106. Oxygen 102 is prepared in air separation unit 104. Nitrogen 103 as prepared in the same unit is used as purge gas in the gasification reactor 105. In gasification reactor 105 slag 108 flows to a water quench 107 to be disposed as slag via 110. The flash gas 112 separated from the slag 110 is send to Claus unit 109. A water bleed 111 is part of the process as illustrated.

The wet raw synthesis gas 113 as prepared is optionally treated in a scrubber unit to remove any solids and ash particles which have not been removed in the water quench before being further processed in a sour water gas shift step 122 yielding a shifted gas 123 and sour water, which is recycled via 124 to water quench 107. Between sour water gas shift step 122 and the gas turbine/steam turbine utilities block 114 heat integration 121 takes place. The shifted gas 123 is sent to an acid gas removal step 126 yielding a carbon dioxide rich gas 131, crude hydrogen 130, $H_2S$ 129 and steam condensate 128. The carbon dioxide rich gas 131 is compressed in compressor 136 to yield compressed carbon dioxide gas 137. The carbon dioxide 137 may be advantageously disposed of by $CO_2$ sequestration in for example sub-surface reservoirs. The crude hydrogen 130 is further processed in a pressure swing absorber (PSA) unit 138 to yield pure hydrogen 140. Part 134 of the crude hydrogen 130 may be used as feed in the gas turbine/steam turbine utilities block 114. The hydrogen rich PSA off-gas 139 is compressed in compressor 133 and used, optionally blended with nitrogen 132, as feed in the gas turbine/steam turbine utilities block 114. Gas turbine/steam turbine utilities block 114 is further provided with a fuel gas, natural gas, feed 115, a water feed 116 and a flue gas outlet 117 and an optional high pressure outlet 119.

The invention is also directed to the following process, of which a preferred embodiment is illustrated in FIG. 3.

A process for upgrading an ash containing and heavy fraction of a tar sand oil by:
(a) supplying an atmospheric distillation bottoms of a tar sands originated feed to a vacuum distillation to obtain a vacuum gas oil and a vacuum bottoms,
(b) contacting the vacuum gas oil with hydrogen in the presence of a suitable hydrocracker catalyst to obtain a sweet synthetic crude
(c) separating the vacuum bottoms obtained in step (a) into an asphalt fraction comprising between 0.1 and 4 wt % ash and a de-asphalted oil,
(d) subjecting said asphalt fraction to a partial oxidation to obtain a mixture of hydrogen and carbon monoxide,
(e) performing a water gas shift reaction on the mixture of hydrogen and carbon monoxide,
(f) separating hydrogen sulphide and carbon dioxide from the shifted gas in an acid removal unit thereby obtaining crude hydrogen,
(g) purifying the crude hydrogen (in a pressure swing absorber) to obtain pure hydrogen and
(h) using part of the pure hydrogen in step (b).

Step (d) is preferably performed by means of the partial oxidation process as described in detail above.

In Table 2 an example is provided of the composition of the streams of FIG. 3 when a feed according to Table 1 is subjected to the process according to the present invention. The numerals in Table 2 refer to FIG. 3.

The invention is also directed to a process for preparing a synthesis gas mixture having a hydrogen to carbon monoxide molar ratio of greater than 1.8 from a liquid hydrocarbon feedstock containing between 0.1 and 4 wt % ash by
(aa) subjecting said feedstock to a partial oxidation and a water quench to obtain a wet synthesis gas mixture of hydrogen and carbon monoxide,
(bb) performing a water gas shift reaction on one part of the wet synthesis gas,
(cc) removing HCN and COS from a second part of the wet synthesis gas,
(dd) performing an acid gas removal step on the combined gaseous effluents of step (bb) and (cc) to remove $NH_3$ and $H_2S$, wherein the desired molar ratio of hydrogen to carbon monoxide in the product gas obtained in step (dd) is controlled by selecting the ratio of wet synthesis gas which is subjected to step (bb) and to step (cc).

Figure 4:
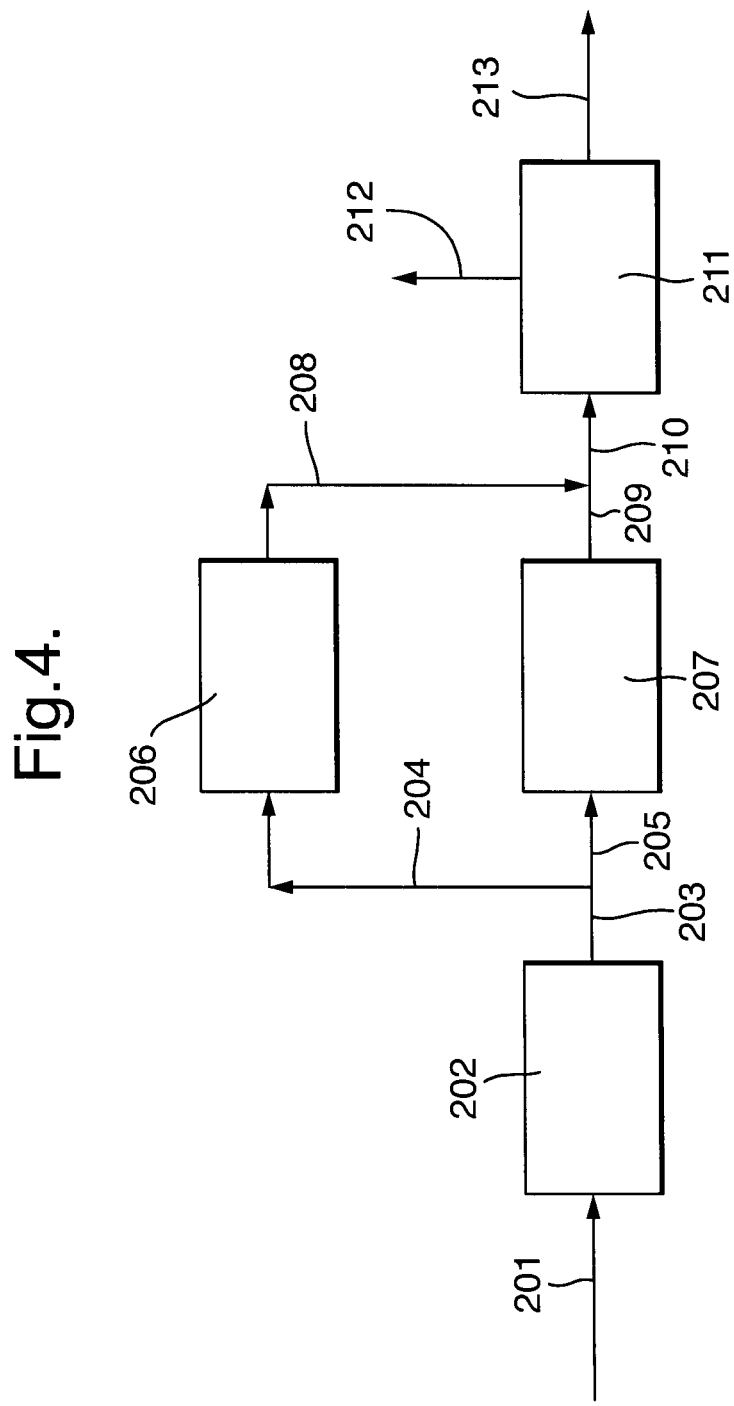
FIG. 4 is a flow diagram of a process according to an aspect of the invention.

FIG. 4 illustrates how the process according to the present invention and the reactor of FIG. 1 can be applied in the production of synthesis gas having a hydrogen over carbon monoxide molar ratio of greater than 1.8, preferably between 1.9 and 2.2. This molar ratio is required when intending to prepare methanol or dimethyl ether (DME) or their mixtures from tar sands oil. Methanol may find in turn advantageous uses, such as feedstock to prepare DME. Another interesting application is the methanol to olefins (MTO) process. DME itself may also find use as feedstock to prepare lower olefins, like ethylene, propylene and butylenes. The wet synthesis gas as prepared in the process of the present invention is relatively rich in CO, the $H_2/CO$ molar ratio amount typically in the range of 0.5-0.6 mol/mol.

In FIG. 4 a synthesis gas 201 is passed through a water quench 202 to obtain a wet synthesis gas 203. The wet synthesis gas prepared is optionally treated in a scrubber unit to remove any solids and ash particles that have not been removed in the water quench before being further processed. The optionally scrubbed gas 203 is split into a first wet synthesis gas 205 and a second wet synthesis gas 204. The first wet synthesis gas is subjected to a water gas shift reaction step 207 to obtain a shifted gas 209. The second wet synthesis gas is subjected to a hydrolysis step 206 to obtain hydrolyzed gas 208, which is combined with shifted gas 209 in acid gas removal feed 210. Feed 210 is fed to an acid gas removal step, for example a Selexol (Registered Trademark of Union Carbide Corporation) or Genosorb (Registered Trademark of Clariant GmbH) type process, to obtain a sour gas 212 and a synthesis product gas 213 having the desired hydrogen to carbon monoxide ratio and purity.

Step (aa) is preferably performed by means of the partial oxidation process as described in detail above.

In Table 3 an example is provided of the composition of the streams of FIG. 4 when a feed according to Table 1 is subjected to the process according to the present invention. The numerals in Table 3 refer to FIG. 4.

TABLE 2

| Component | | Wet raw syngas 113 | Gas ex shift section 123 | Sour gas 112 | $CO_2$ 137 | Raw Hydrogen 130 | Pure Hydrogen 140 | PSA off gas 139 |
|---|---|---|---|---|---|---|---|---|
| Methane | % mol | 0.05 | 0.07 | <0.01 | 0.05 | 0.11 | — | 0.74 |
| Argon | % mol | 0.02 | 0.03 | — | — | 0.04 | 0.04 | 0.06 |
| COS | % mol | 0.04 | — | — | — | — | — | — |
| $H_2S$ | % mol | 0.48 | 0.74 | 61 | 5 ppm | — | — | — |
| $H_2O$ | % mol | 56.18 | — | 5 | 0.05 | — | — | — |
| $H_2$ | % mol | 15.36 | 59.23 | <0.01 | 0.7 | 93.81 | 99.82 | 60.87 |
| $N_2$ | % mol | 0.53 | 0.76 | — | — | 1.20 | 0.14 | 7.04 |
| $CO_2$ | % mol | 0.54 | 38.01 | 34 | 99.1 | 3.01 | — | 19.53 |
| CO | % mol | 26.79 | 1.15 | <0.01 | 0.1 | 1.82 | — | 11.78 |
| HCN | % mol | 0.01 | — | — | — | — | — | — |
| $NH_3$ | % mol | 0.01 | 0.02 | 0.01 | — | — | — | — |

TABLE 3

|  |  | Wet raw Syngas (203) | Gas after one stage CO-shift Section (209) | Gas ex Hydrolysis Section (208) | Combined syngas $H_2/CO = 2.0$ (210) | Dry combined Syngas (213) $H_2/CO = 2.0$ |
|---|---|---|---|---|---|---|
| Methane | % mol | 0.05 | 0.05 | 0.05 | 0.05 | 0.09 |
| Argon | % mol | 0.019 | 0.02 | 0.02 | 0.02 | 0.03 |
| COS | % mol | 0.042 | | | | |
| $H_2S$ | % mol | 0.475 | | | | |
| $H_2O$ | % mol | 56.184 | 34.08 | 56.49 | 43.68 | |
| $H_2$ | % mol | 15.356 | 37.84 | 15.44 | 28.24 | 50.14 |
| $N_2$ | % mol | 0.531 | 0.53 | 0.53 | 0.53 | 0.95 |
| $CO_2$ | % mol | 0.54 | 22.95 | 0.54 | 13.35 | 23.70 |
| CO | % mol | 26.786 | 4.52 | 26.93 | 14.13 | 25.08 |
| HCN | % mol | 0.008 | | | | |
| $NH_3$ | % mol | 0.008 | | | | |
| $H_2/CO$ | mol/mol | 0.57 | 8.36 | 0.57 | 2.00 | 2.00 |

The invention claimed is:

1. A process for preparing a synthesis gas mixture having a hydrogen to carbon monoxide molar ratio of greater than 1.8 from a liquid hydrocarbon feedstock containing between 0.1 and 4 wt % ash by
   (aa) subjecting said feedstock to a partial oxidation and a water quench to obtain a wet synthesis gas mixture of hydrogen and carbon monoxide,
   (bb) performing a water gas shift reaction on one part of the wet synthesis gas,
   (cc) removing HCN and COS from a second part of the wet synthesis gas,
   (dd) performing an acid gas removal step on the combined gaseous effluents of step (bb) and (cc) to remove NH3 and H2S,
   wherein the desired molar ratio of hydrogen to carbon monoxide in the product gas obtained in step (dd) is controlled by selecting the ratio of wet synthesis gas which is subjected to step (bb) and to step (cc),
   wherein step (aa) is performed by a process comprising performing a partial oxidation on a hydrocarbon feed using a multi-orifice burner provided with an arrangement of separate co-annular passages, wherein the hydrocarbon flows through a passage of the burner, an oxidizer gas flows through a separate passage of the burner and wherein the passage for hydrocarbon and the passage for oxidizer gas are separated by a passage through which a moderator gas flows and wherein the exit velocity of the moderator gas is greater than the exit velocity of the oxidizer gas.

* * * * *